US008160069B2

United States Patent
Jacobson et al.

(10) Patent No.: US 8,160,069 B2
(45) Date of Patent: *Apr. 17, 2012

(54) SYSTEM FOR FORWARDING A PACKET WITH A HIERARCHICALLY STRUCTURED VARIABLE-LENGTH IDENTIFIER

(75) Inventors: Van L. Jacobson, Woodside, CA (US); James D. Thornton, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 173 days.

This patent is subject to a terminal disclaimer.

(21) Appl. No.: 12/565,005

(22) Filed: Sep. 23, 2009

(65) Prior Publication Data

US 2010/0195653 A1   Aug. 5, 2010

Related U.S. Application Data

(60) Provisional application No. 61/148,871, filed on Jan. 30, 2009.

(51) Int. Cl.
   *H04L 12/56* (2006.01)
(52) U.S. Cl. ......... 370/392; 370/390; 370/256; 370/400
(58) Field of Classification Search .................. 370/390, 370/392, 256, 400
   See application file for complete search history.

(56) References Cited

U.S. PATENT DOCUMENTS

| 5,870,605 | A | 2/1999 | Bracho |
| 6,091,724 | A * | 7/2000 | Chandra et al. ............... 370/390 |
| 2008/0287142 | A1* | 11/2008 | Keighran ................... 455/456.5 |
| 2010/0195654 | A1* | 8/2010 | Jacobson et al. .............. 370/392 |
| 2010/0195655 | A1* | 8/2010 | Jacobson et al. .............. 370/392 |

FOREIGN PATENT DOCUMENTS

| WO | 03005288 A2 | 1/2003 |
| WO | 03005288 A3 | 1/2003 |
| WO | 03049369 A2 | 6/2003 |

* cited by examiner

*Primary Examiner* — Robert Wilson
*Assistant Examiner* — Mohamed Kamara
(74) *Attorney, Agent, or Firm* — Shun Yao; Park, Vaughan, Fleming & Dowler LLP (57) ABSTRACT

One embodiment provides a system that receives a packet with a hierarchically structured variable-length identifier (HSVLI). An HSVLI indicates a piece or collection of content and may be hierarchically structured, comprising contiguous components ordered from a most general level to a most specific level. The length of a respective identifier is not fixed. During operation, the system converts the HSVLI into a fixed-length key. Subsequently, the system obtains forwarding information based on one or more longest-prefix matches with a longest-prefix-match lookup engine using the fixed-length key. Next, the system forwards the packet to an output port based on the forwarding information.

24 Claims, 6 Drawing Sheets

SYSTEM FOR FORWARDING A PACKET WITH A HIERARCHICALLY STRUCTURED VARIABLE-LENGTH IDENTIFIER

RELATED APPLICATION

This application claims the benefit of U.S. Provisional Application No. 61/148,871, entitled "OPTIMIZED CCN FORWARDING BY ADAPTATION OF EXISTING LOOKUP ENGINES FOR VARIABLE LENGTH CONTENT NAMES," by inventors Van Jacobson and James Thornton, filed 30 Jan. 2009.

The subject matter of this application is related to the subject matter in the following applications:

U.S. patent application Ser. No. 12/123,344, entitled "VOICE OVER CONTENT-CENTRIC NETWORKS," by inventors Paul Stewart, Van Jacobson, Michael Plass, and Diana Smetters, filed 19 May 2008; and U.S. patent application Ser. No. 12/332,560, entitled "METHOD AND APPARATUS FOR FACILITATING COMMUNICATION IN A CONTENT-CENTRIC NETWORK," by inventor Van Jacobson, filed 11 Dec. 2008, the disclosures of which are incorporated by reference in their entirety herein.

BACKGROUND

1. Field

The present disclosure relates generally to facilitating communication over a data network. More specifically, the present disclosure relates to a method for adapting a longest-prefix-match lookup engine to accommodate hierarchically structured variable-length identifiers for forwarding data.

2. Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. That is, a consumer of content can only receive the content by explicitly requesting the content from an address (e.g., IP address) closely associated with a physical object or location. This restrictive addressing scheme is becoming progressively inadequate for meeting the ever-changing network demands.

The current architecture of the Internet revolves around a conversation model, which was created in the 1970s for the ARPAnet to allow geographically distributed users to use a few big, immobile computers. This architecture was designed under the influence of the telephone network, where a telephone number is essentially a program that configures the switches along a path from the source to the destination. Not surprisingly, the designers of the ARPAnet never expected it to evolve into today'subiquitous, relentlessly growing Internet. People now expect a lot more from the Internet than the ARPAnet was designed for. Ideally, an Internet user should have access to any content, anywhere, at any time. Such access is difficult to guarantee with the current location/device-binding IP protocol.

Under current web-based naming structures, an idea of the host is implicit in the name which contains the corresponding content. For example, http://www.amazon.com/index.html can be found by contacting the machine www.amazon.com. However, this contact requires a Domain Name System (DNS) to translate a human-readable host name into an IP address (e.g., 209.34.123.178). In current computer systems, there is no way to refer to a piece of content without knowing what host that file is stored on, and even then the contents associated with that file might change.

In the current technology, forwarding is the process by which a node in a packet-switched network transmits a packet from a source address to a fixed-length destination address. An Internet Protocol (IP) forwarder is typically called a router. The router receives a packet at one of its input ports (i.e., network interface). Next, the router uses a longest-prefix-match lookup engine to find an output port to which the packet should be forwarded based on the packet's destination address. Subsequently, the router sends the packet to the output port, which is usually different from the input port. The lookup engine in an IP forwarder uses a longest-prefix-match because more than one lookup engine entry can match the destination address. Although the current IP router technology works well with IP packets, which have fixed-length IP addresses, such routers cannot handle packets with variable-length identifiers.

SUMMARY

One embodiment provides a system that receives a packet with a hierarchically structured variable-length identifier (HSVLI). An HSVLI indicates a piece of content and indicates a hierarchical structure of contiguous components ordered from a most general level to a most specific level. The length of a respective identifier is not fixed. During operation, the system converts the HSVLI into a fixed-length key. Subsequently, the system obtains forwarding information based on one or more longest-prefix matches with a longest-prefix-match lookup engine using the fixed-length key. Next, the system forwards the packet to an output port based on the forwarding information.

In some embodiments, converting the HSVLI into the fixed-length key includes dividing the fixed-length key into c segments $s_1, \ldots, s_c$, indicating component hashes for the first $c-1$ components of the HSVLI with segments $s_1, \ldots, s_{c-1}$, and indicating a hash over the remaining components of the HSVLI with segment $s_c$.

In some embodiments, the lengths of the c segments are not equal and the length of a respective segment can be dynamically re-configured.

In some embodiments, the system dynamically determines the lengths of the c segments, the number of HSVLI components hashed into each segment, and/or a value to be arithmetically combined with the fixed-length key, based at least on one or more of the initial components of the HSVLI.

In some embodiments, the longest-prefix-match lookup engine is an Internet Protocol (IP) router.

In some embodiments, the fixed-length key is an Internet Protocol version 4 (IPv4) or an Internet Protocol version 6 (IPv6) address.

In some embodiments, the forwarding information includes at least one output port.

In some embodiments, the hierarchical structure includes one or more of: a globally routable name, an organizational name, a version identifier, and a digest.

BRIEF DESCRIPTION OF THE FIGURES

In the figures, like reference numerals refer to the same figure elements.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

DETAILED DESCRIPTION

Overview

Existing longest-prefix-match lookup engines can only handle addresses of relatively small fixed lengths. Embodiments of the present invention involve adapting existing longest-prefix-match lookup engines to longer, variable-length packet identifiers. More specifically, embodiments of the present invention involve hashing long variable-length packet identifiers into multiple short keys usable with existing lookup engines, thereby facilitating fast forwarding in content-centric networks by using existing hardware building blocks. Embodiments of the present invention can enable forwarding of packets with HSVLIs in an IP (Internet Protocol) router, which uses longest-prefix-match lookup engines with fixed-length addresses such as Internet Protocol version 4 (IPv4) and Internet Protocol version 6 (IPv6) addresses.

Content centric networks bring a new approach to content transport. Instead of having network traffic viewed at the application level as end-to-end conversations over which content travels, content is requested or returned based in part on the name given to it, and the network is responsible for routing content from the provider to the consumer. Content includes data that can be transported in the communication system, including any form of data such as text, images, video, and/or audio. A consumer and a provider can be a person at a computer or an automated process inside or outside the network. In such a network, a piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In content-centric networks, unlike a conventional IP network, a packet may be identified by an HSVLI, which can be structured or unstructured. For example, "abcd/bob/papers/ccn/news" could be the name of the content and identifies the corresponding packet(s) i.e., the "news" article from the "ccn" collection of papers for a user named "Bob" at the organization named "ABCD."

To request a piece of content, a node registers (e.g., broadcasts) an interest in that content by the content's name. An interest in a piece of content can be a query for the content according to the content's name or identifier. The content, if available in the network, is routed back to it from any node that stores the content. The routing infrastructure intelligently propagates the interest to the prospective nodes that are likely to have the information and then carries available content back along the path which the interest traversed.

Figure 1:
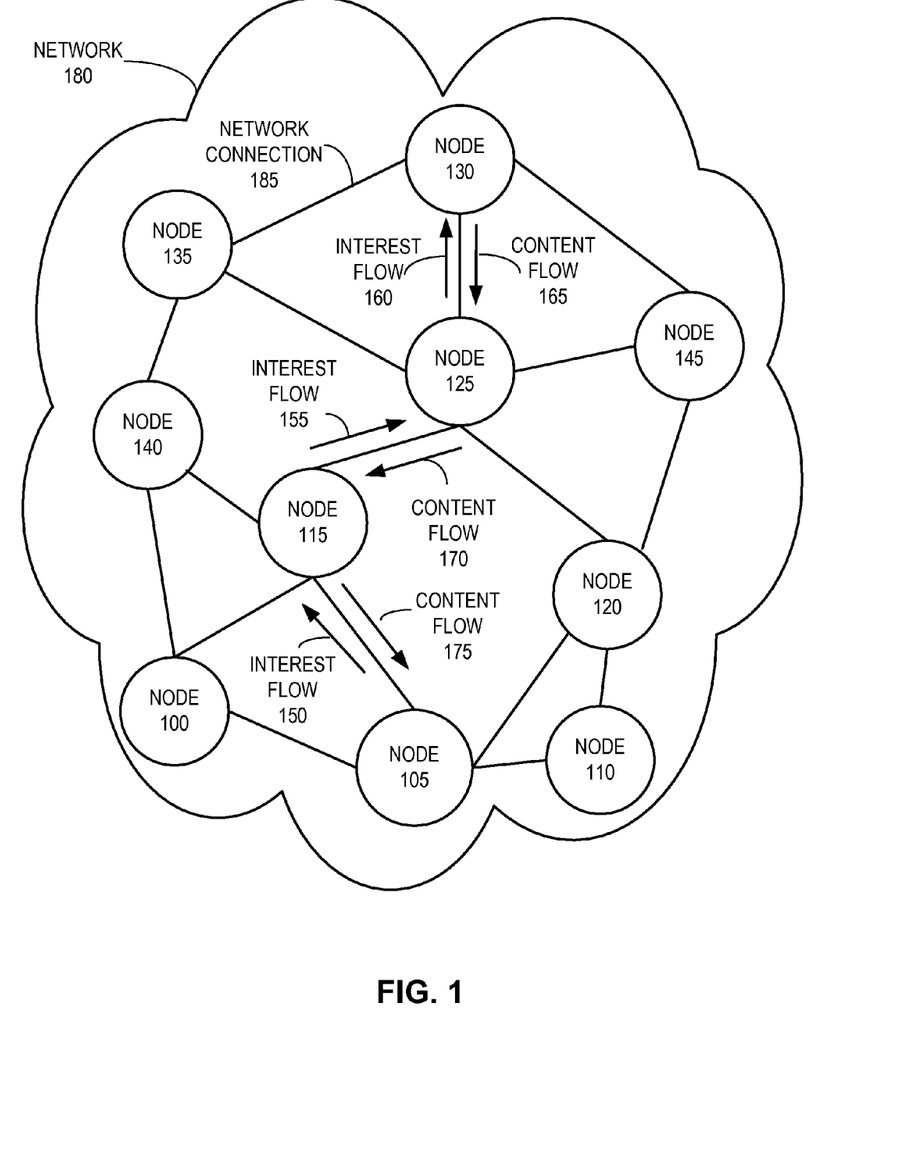
FIG. 1 illustrates an exemplary network where packets have HSVLIs in accordance with an embodiment.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks which can couple one node to another node. Network 180 can be a local network, a super-network or a sub-network. Each of these networks can be interconnected so that a node in one network can reach a node in other networks. The network connection can be broadband, wireless, telephonic, satellite, or any type of network connection. A node can be a computer system, an end-point representing users, and/or a device that can generate interests or originate content.

In accordance with an embodiment of the present invention, a consumer can generate an interest in a piece of content and then send that interest to a node in network 180. The piece of content can be stored at a node in network 180 by a publisher or content provider, who can be located inside or outside the network. For example, in FIG. 1, the interest in a piece of content originates at node 105. If the content is not available at the node, the interest flows to one or more nodes coupled to the first node. For example, in FIG. 1, the interest flows (interest flow 150) to node 115, which does not have the content available. Next, the interest flows (interest flow 155) from node 105 to node 125, which again does not have the content. The interest then flows (interest flow 160) to node 130, which does have the content available. The flow of the content then retraces its path (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the interest generation node (node 105) can participate in caching local copies of the content as it travels across the network. Caching reduces the network load for a second subscriber located in proximity to other subscribers by implicitly sharing access to the locally cached content Forwarding Packets with HSVLIs Conventional packet forwarding is based on addresses assigned to nodes (or interfaces of nodes). In IP addressing, a hierarchical division of addresses is used so that the first portion of an address identifies a network, later portions identify a sub-network within that network, and the end of the address identifies a particular host within a sub-network. This arrangement allows the responsibility for assigning unique addresses to be delegated and thereby distributed so that the Internet can scale to worldwide size. It also enables scaling by limiting the amount of information an IP router needs to process when forwarding a packet to an output port.

In one embodiment, a packet is identified by an HSVLI with a hierarchical structure. The hierarchical structure of this HSVLI offers several advantages over the hierarchical structure of an IP address. Such an identifier can describe the structure explicitly through the name rather than implicitly through an IP routing table entry, which includes a subnet mask. Thus, in an HSVLI a naming mistake in the hierarchy can be detected through inspection, whereas an IP-based subnet mask mistake might route a packet to the wrong address and is more difficult to detect.

In general, the lookup engine in an IP forwarder uses a longest-prefix-match because more than one lookup engine entry can match the destination address. The most specific entry—the one with the longest subnet mask—is called the longest-prefix-match. For example, suppose the lookup engine has the following IPv4 entries: 192.168.20.16/28 and 192.168.0.0/16. The destination address 192.168.20.19 of an incoming packet matches both entries. However, the longest-prefix-match is 192.168.20.16/28 because the subnet mask "/28" is longer than the other entry's subnet mask "/16." Note that a subnet mask specifies the leading bits (i.e., those that are set to "1" in the subnet mask) used when matching its corresponding address. The more leading bits are set to "1," the more specific the match is.

Longest-prefix match allows a datagram's destination address to be interpreted at different "resolutions" depending on the local environment. For example, far away from the destination 13.1.64.93 (alpha.parc.xerox.com) there might only be an IPv4 entry for subnet address "13/8" (corresponding to subnet mask 255.0.0.0) that gets the datagram to the closest net 13 (Xerox) border gateway. At that border gateway there may be an entry for subnet address "13.1/16" and possibly "13.2/16," . . . (corresponding to subnet mask 255.255.0.0) that gets the datagram to the closest subnet 13.1 (parc.xerox.com) border gateway. At that gateway, there may be an entry for subnet address "13.1.64/24" (corresponding to subnet mask 255.255.255.0) that gets the datagram to PARC's 13.1.64 subnet, and so on. Longest-prefix match allows high resolution local information (the /16 and /24 prefixes) to override lower resolution global information (the /8 prefix) in the same routing table.

A longest-prefix-match, in contrast to an exact match, allows the divisions between parts of an address to vary across the (global) network and supports flexibility for widely varied topologies. The HSVLIs described herein are also hierarchical to enable delegation of naming responsibility and minimal forwarding state. However, IP addresses (and other conventional network addresses) are relatively short. An IPv4 address, for example, may be written out for human understanding as 192.9.200.6 but is internally always a 32-bit number, while IPv6 addresses are 128 bits long.

In all of the existing IP routers, the addresses being processed are of fixed length. Unlike conventional addresses, therefore, there is no fixed length of the packet identifier described herein. In fact, an individual component of an HSVLI may have an arbitrary length. Such an HSVLI can have explicitly delimited components, can include any sequence of bytes, and is not limited to human-readable characters.

A longest-prefix-match lookup is beneficial to forwarding of packets with HSVLIs. For example, an interest in "/parc/home/smetters" will match both "/parc/home/smetters/test.txt" and "/parc/home/smetters/bar.txt" (that is, the packets identified by both these names). The longest match, in terms of the number of name components, is considered the best because it is the most specific. Embodiments of the present invention provide a mechanism to adapt an existing longest-prefix-match lookup engine so that it can perform a longest-prefix-match lookup with a variable-length packet identifier.

Figure 2:
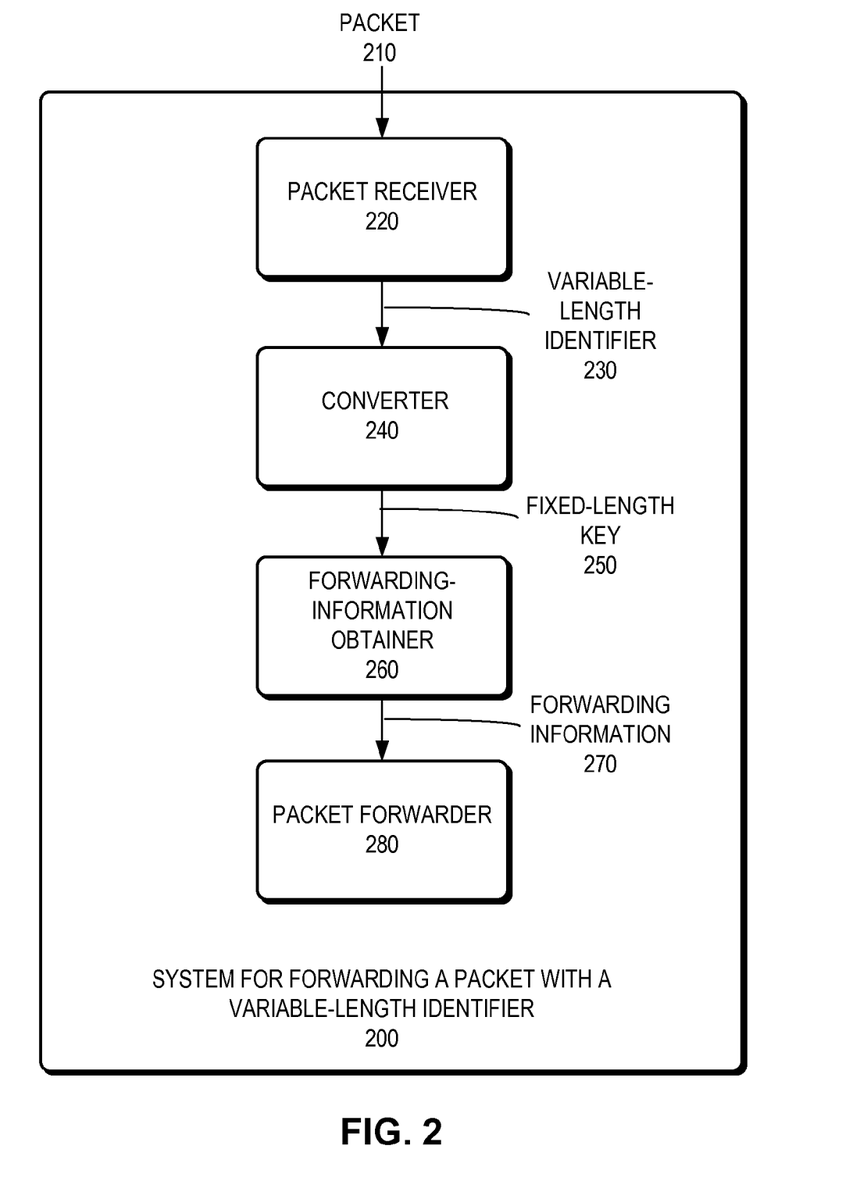
FIG. 2 illustrates an architecture of an exemplary system for forwarding a packet with an HSVLI in accordance with an embodiment.

FIG. 2 illustrates an overview of an exemplary system for forwarding a packet with an HSVLI in accordance with an embodiment. A system 200 for forwarding a packet with an HSVLI includes a packet receiver 220, a converter 240, a forwarding-information obtainer 260, and a packet forwarder 280. Packet receiver 220 receives a packet 210 from an input port. The packet 210 includes an HSVLI 230, which indicates a piece of content and indicates a hierarchical structure of contiguous components ordered from a most general level to a most specific level. For example, an HSVLI might be "a/b/c/d," where "a" is the most general level and "a/b/c/d" is the most specific level.

Next, converter 240 takes as input HSVLI 230 and produces a fixed-length key 250. Converter 240 converts HSVLI 230 into a fixed-length format usable by a longest-prefix-match lookup engine. Forwarding-information obtainer 260 uses the fixed-length key 250 to produce forwarding information 270, which is then input into packet forwarder 280. Forwarding information can indicate at least one output port to which packet forwarder 280 forwards the packet. A node includes one or more input and output ports, which are coupled to other nodes. Generally, the system (which can reside at a node) attempts to choose output ports that optimize some criteria such as packet travel time or the number of hops between nodes. Note that a typical longest-prefix-match forwarder will forward the packet based on a longest-prefix match of a fixed-length address. In contrast, a forwarder described herein forwards the packet based on an HSVLI rather than an address. Embodiments of the present invention allow a typical longest-prefix-match forwarding engine to perform a longest-prefix-match on a variable-length packet identifier.

Figure 3:
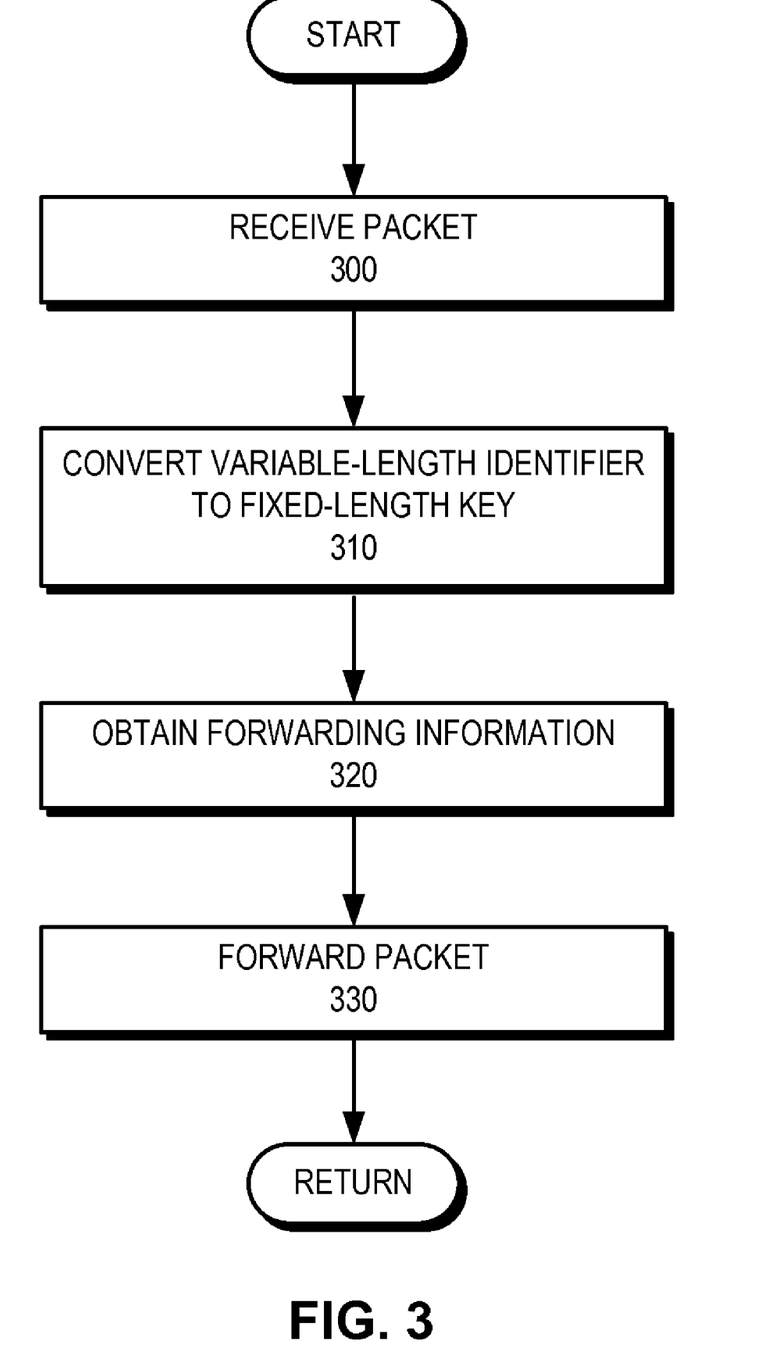
FIG. 3 presents a flow chart illustrating the process of forwarding a packet with an HSVLI in accordance with an embodiment.

FIG. 3 presents a flow chart illustrating the process of forwarding a packet with an HSVLI in accordance with an embodiment. During operation, the system receives a packet at an input port (operation 300). The packet includes an HSVLI, which indicates a hierarchical structure of contiguous components ordered from a most general level to a most specific level. A component in the hierarchical structure can include a globally routable name, an organizational name, a version identifier, a signature, a digest, a publisher, a cyclic-redundancy check, a length in terms of the number of components, a number of bits or bytes per component, or a time-to-live (TTL).

Once the system has received the packet (operation 300), it converts the HSVLI indicated by the packet into a fixed-length key (operation 310). Note that an HSVLI includes one or more contiguous components beginning with a component at the most general level. For example, "a/b" is a prefix of "a/b/c/d." In this example, "a" is at the most general level and "a," "b," "c," and "d" are contiguous elements.

Next, the system obtains forwarding information based on one or more longest-prefix-match lookups in a longest-prefix-match lookup engine using the fixed-length key (operation 320). Subsequently, the system forwards the packet to an output port based on the forwarding information (operation 330). The system can exclude the input port as a port to which the packet can be forwarded. This is because a shortest path route to a node that contains content which matches the HSVLI cannot be one that backtracks through the input port.

In one embodiment, the forwarder can decrement the TTL value as part of a content name before forwarding the packet. The TTL is a limit on the period of time or the number of hops that the packet can remain in circulation. When the TTL reaches zero, the packet can be discarded. Thus the TTL can reduce the number of undeliverable packets in circulation. The forwarder can also recompute the checksum (e.g., a cyclic-redundancy checksum) after any change to the packet but before forwarding. In general, the forwarder can modify any aspect of the packet before forwarding.

Converting an HSVLI to a Fixed-Length Key

Figure 4:
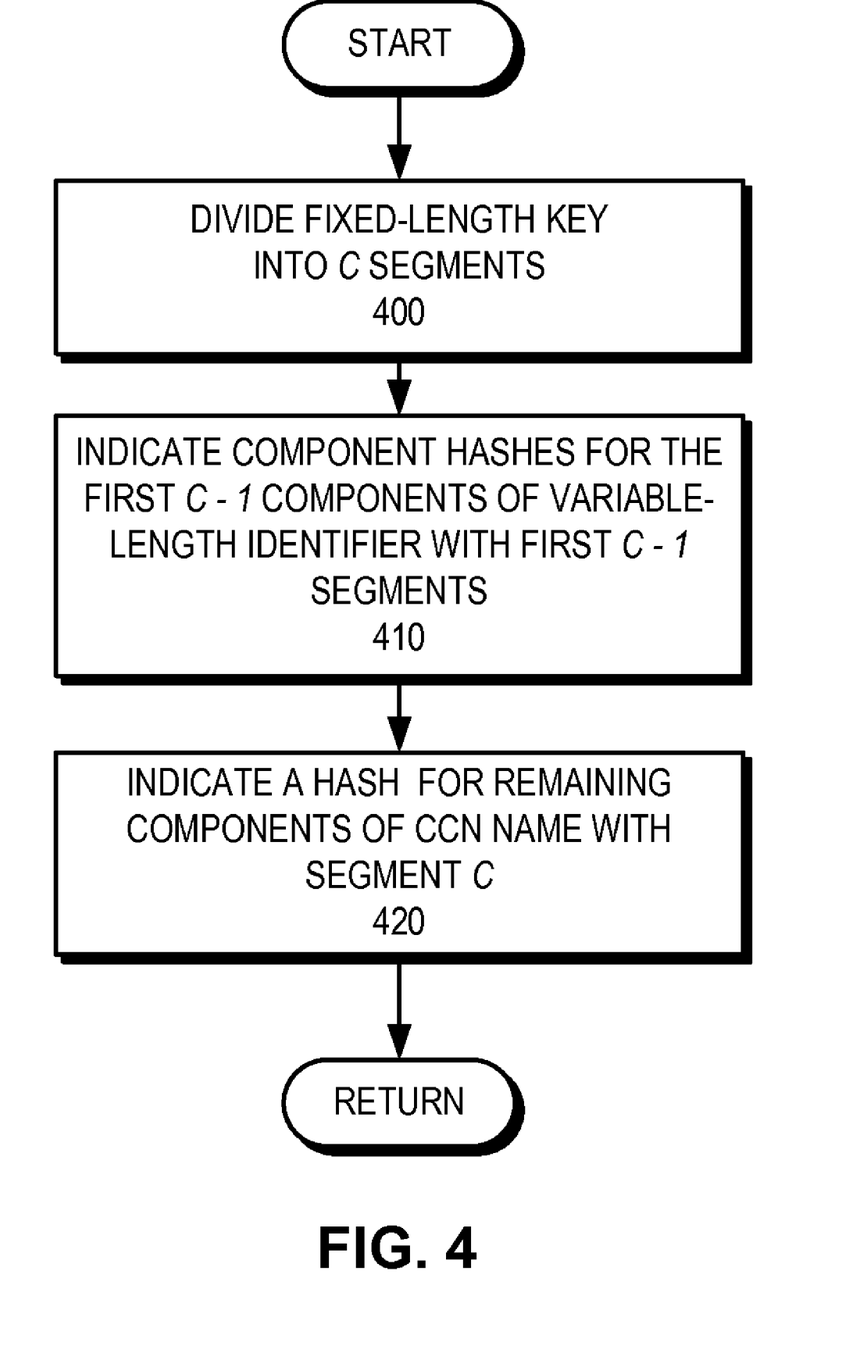
FIG. 4 presents a flow chart illustrating the process of converting HSVLI into a fixed-length key in accordance with an embodiment.

FIG. 4 presents a flow chart illustrating the process of converting an HSVLI in accordance with an embodiment. First, the system divides the fixed-length key into c segments $s_1, \ldots, s_c$ (operation 400). Next, the system computes hashes for the first c−1 components of the HSVLI and places these hash values in segments $s_1, \ldots, s_{c-1}$ (operation 410). Subsequently, the system computes a hash over the remaining components of the HSVLI and places this hash in segment $s_c$ (operation 420).

Figure 5:
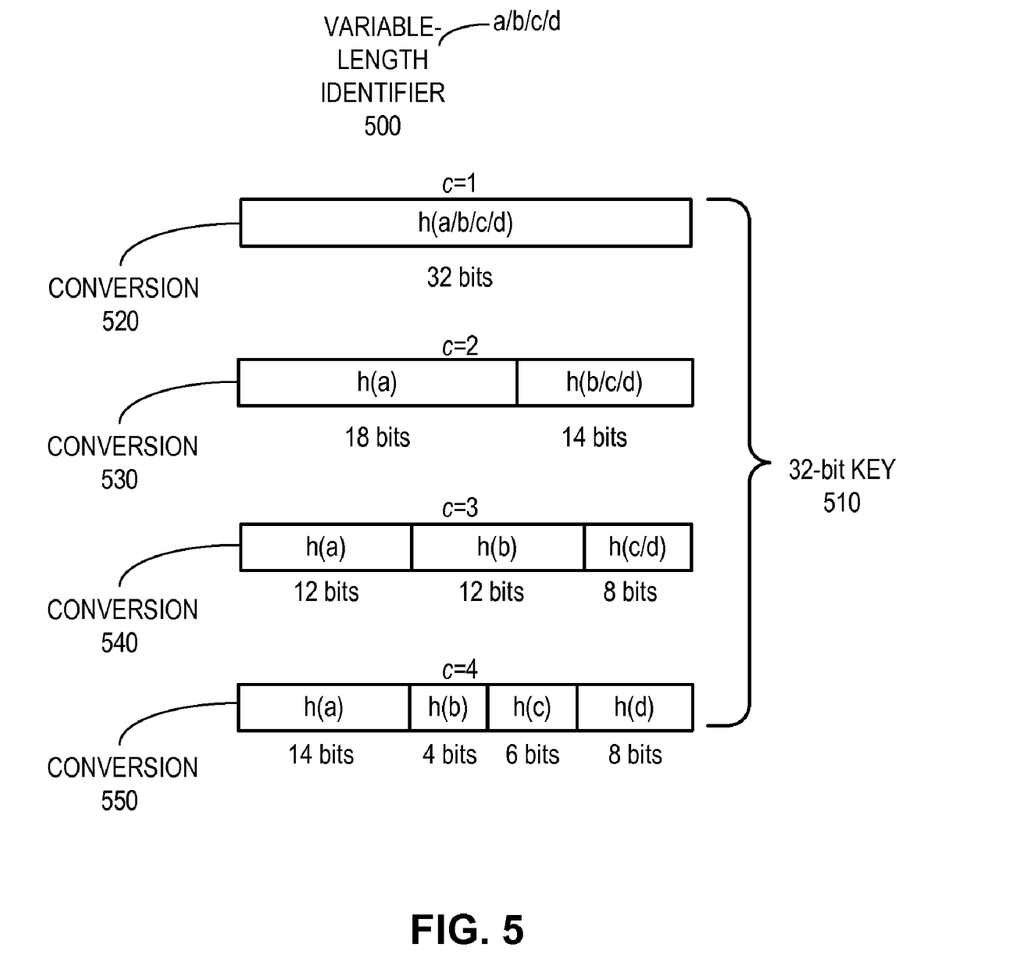
FIG. 5 illustrates an exemplary HSVLI converted into several different fixed-length keys, in accordance with an embodiment.

FIG. 5 illustrates an exemplary HSVLI converted into several different fixed-length keys, in accordance with an embodiment. FIG. 5 shows HSVLI 500 as "a/b/c/d." HSVLI 500 can be converted many different ways; FIG. 5 illustrates only a few of the ways in which HSVLI 500 can be converted. All conversions shown in FIG. 5 use a fixed-length 32-bit key (32-bit keys 510). Other fixed-length keys are possible, such as IPv6 128-bit addresses.

Conversion 520 corresponds to a fixed-length key divided into only one segment, i.e., c=1. Note that c−1=0 because c=1. Hence, conversion 520 does not show component hashes for the first c−1 (0) components. The function "h(a/b/c/d)" is shorthand for the "hash of "a/b/c/d," which is the hash value derived from "a/b/c/d." Since c=1, conversion 520 shows that all 32 bits are used to store "h(a/b/c/d)."

Conversion 530 corresponds to a fixed-length key divided into two segments, i.e., c=2. Note that c−1=1 in this conversion. Hence, conversion 530 shows only a component hash for "a" (i.e., "h(a)") as indicated by the first segment, which is stored in 18 bits. Conversion 530 also shows a hash over the remaining components of the HSVLI (i.e., "h(b/c/d)") indicated by the last segment, which is stored in 14 bits.

Conversion 540 corresponds to a fixed-length key divided into three segments, i.e., c=3. Note that c−1=2 in this conversion. Hence, conversion 540 shows a component hash for "a" (i.e., "h(a)"), as indicated by the first segment, which is stored in 12 bits; and a component hash for "b" (i.e., "h(b)"), as indicated by the second segment, which is stored in 12 bits. Conversion 540 also shows a hash over the remaining components of the HSVLI (i.e., "h(c/d)"), indicated by the last segment, which is stored in 8 bits.

Conversion 550 corresponds to a fixed-length key divided into four segments, i.e., c=4. Note that c−1=3 in this conversion. Hence, conversion 550 shows a component hash for "a" (i.e., "h(a)"), as indicated by the first segment, which is stored in 14 bits; a component hash for "b" (i.e., "h(b)"), as indicated by the second segment, which is stored in 4 bits; and a component hash for "c" (i.e., "h(c)") as indicated by the third segment, which is stored in 6 bits. Conversion 550 also shows a hash over the remaining component of the HSVLI (i.e., "h(d)"), indicated by the last segment, which is stored in 8 bits.

Note that the length of the segments (i.e., number of bits) does not have to be equal, and the length of a respective segment can be dynamically reconfigured. For example, conversion 530 shows "h(a)" stored in 18 bits, conversion 540 shows "h(a)" stored in 12 bits, and conversion 550 shows "h(a)" stored in 14 bits. The number of bits varies for "h(a)" in conversions 530-550 to illustrate that the first component can be part of different component structures arising in different applications. For example, in conversion 530 the first component hash has 18 bits of possible values. In conversion 540 the first component hash has 12 bits of possible values. In conversion 550 the first component hash has 14 bits of possible values. In general, the number of bits associated with each component hash can be based at least on the number of possible values for each component that will be needed at that forwarding point and the entropy of each component.

Note that, to retain the "higher resolution of local information" feature of longest-match forwarding, the number of segments and their lengths can be dynamically determined using one or more of the initial components of the HSVLI. The choice of c can be influenced by the distribution of identifiers that will be needed at that forwarding point as may be determined from computing statistics on the set of lookup entries when the forwarding table is populated. In one embodiment, the choice of c and allocation of bits within the fixed-length key can be dynamically determined based on the contents of the early parts of the HSVLI. This allows a range of prefixes (for example, one containing just a single value like "parc.com") to be treated differently. As a result, the mapping from an HSVLI to a fixed-length key can be made sensitive to the entropy distribution associated with different classes of prefixes. For example, an HSVLI corresponding to intranet names should have most bits allocated to later components (e.g. conversion 550 in FIG. 5), since the later HSVLI components carry more meaningful information. In contrast, an HSVLI corresponding to an external name should have most bits allocated to the first HSVLI component, where most of the variation will be used to distinguish different entries (e.g. conversion 530 in FIG. 5). Rather than having a single mapping scheme per table instance (or per table per load), the scheme can be determined by first examining the first component (or a number of components of prefix) of each packet as it comes in. In terms of the flow, this process can be seen as a specialized lookup performed before or as part of the mapping used to obtain the fixed-length key that will be used for the main table lookup.

Furthermore, it is possible to do much of the HSVLI conversion incrementally as bits come off the wire. Some of the existing longest-prefix-match implementations can operate incrementally and therefore can perform "cut-through" forwarding of the HSVLI packets. Others require the entire address/key, but in the present invention, the HSVLI-to-fixed-length-key conversion could still be performed as bits are received, before the lookup occurs.

Lookup Engine

The lookup engine can include one or more of the following: ternary content-addressable memory (TCAM), tree structures, and Bloom filters. More generally, any lookup engine which can be adapted to a longest-prefix-match can be used.

A content-addressable memory (CAM) is a memory where each storage location has a comparator for each bit so that the CAM can search for an input value in parallel across all content locations, returning a match with an associated value in one cycle. A TCAM stores a care/don't care bit for each value bit in a memory location so that it enables partial matches. This enables the prefix matching that is required for today's "classless" IP addressing because each entry can be set to an exact match on some number of initial bits of the word and "don't care" for the remaining bits. In the case of multiple matching prefixes, generally the first match is returned, so longest-prefix match can be achieved by loading the TCAM in order of decreasing prefix length.

Tree structures can be used to implement a longest-prefix match as a prefix in a tree (also known as a trie). The basic form of a tree has a node branch for every character in a prefix (every bit in an IP address context where the alphabet is 0,1). Using a tree, the lookup can be performed as the address is decoded (bit by bit) from the wire. The longest matches so far can be retained on a stack as the tree is traversed, so that if there is not a complete match, the longest-prefix match can be quickly found.

In a radix trie, a certain number of bits can be used to select a sub-tree at each level. With an 8-bit radix, for example, the first 8 bits indexes one of 256 possible sub-trees of the root, and the next 8 bits indexes one of 256 possible sub-trees at the second level.

A Patricia Tree is a minimum entropy prefix search tree, with nodes representing only those bits that are discriminators between different entries. Each node identifies the bit position to examine at that level that distinguishes different prefix entries.

A Bloom filter includes a bit array of m bits and k different hash functions, which map from an element to one of the m array positions (randomly, as chosen from a uniform distribution). Initially, all bits of the Bloom filter are set to 0. Adding an element to the Bloom filter involves hashing on the element with each of the k hash functions to get k array positions. Each of the bits at all these positions is set to 1. Determining membership of an element (i.e., testing whether it is in the set comprising the Bloom filter) involves hashing the element with each of the k hash functions to get k positions. If all of the positions indicate a 1, then the element is in the set. Otherwise, the element is not in the set. A Bloom filter can result in false positives (i.e., a positive result may be obtained for an item that is not in the set) but not false negatives (i.e., a Bloom filter can definitively tell when an item is not a member of the set). A group of Bloom filters, one for each prefix length, can be queried in parallel leading to a secondary lookup in a hash table for each filter that finds a match. Various optimizations may be used to adapt to different prefix distributions, such as an initial direct lookup array for the first few prefix lengths that may have very few entries.

Apparatus for Forwarding a Packet with an HSVLI

Figure 6:
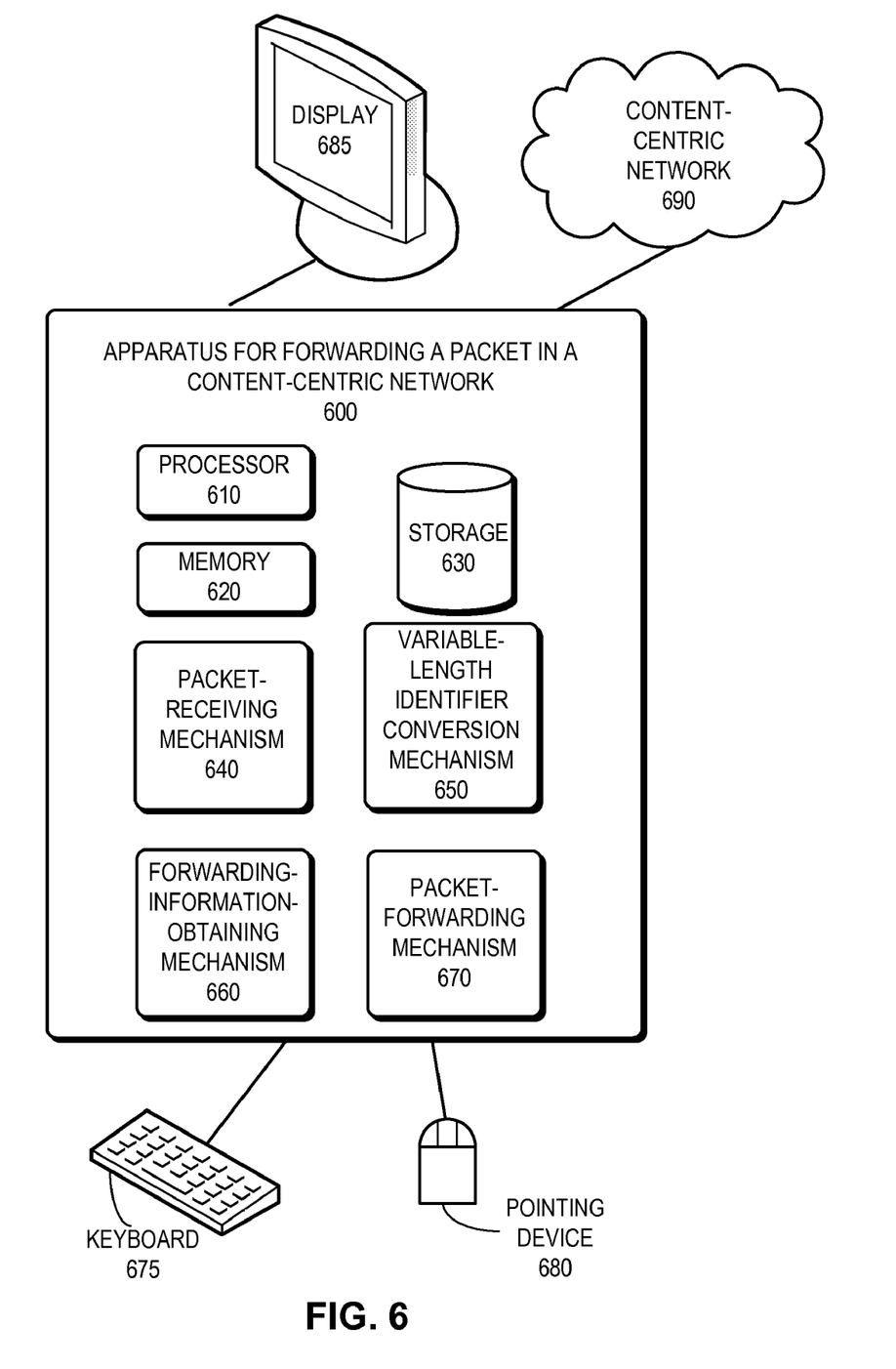
FIG. 6 presents an exemplary apparatus for forwarding a packet with an HSVLI in accordance with an embodiment.

FIG. 6 presents an exemplary apparatus for forwarding a packet with an HSVLI in accordance with an embodiment.

Apparatus 600 for forwarding a packet with an HSVLI comprises a processor 610, a memory 620, a storage 630, a packet-receiving mechanism 640, an HSVLI conversion mechanism 650, a forwarding-information-obtaining mechanism 660, and a packet-forwarding mechanism 670, all of which can be in communication with each other through various means.

In some embodiments, mechanisms 640-670 can be part of processor 610. Further, in some embodiments, the system may not include a separate processor and memory. Instead, in addition to performing their specific tasks, mechanisms 640-670, either separately or in concert, may be part of a general-purpose computation engine.

Storage 630 stores programs to be executed by processor 610. Specifically, storage 630 stores a program that implements a system (application) for forwarding a packet with an HSVLI. During operation, the application program can be loaded from storage 630 into memory 620 and executed by processor 610. As a result, apparatus 600 for forwarding a packet with an HSVLI can perform the functions described above. Apparatus 600 for forwarding a packet with an HSVLI can be coupled to an optional display 685, keyboard 675, and pointing device 680. Apparatus 600 is also coupled to content centric network 690.

In an embodiment, processor 610 activates packet-receiving mechanism 640 and supplies it with the packet. Next, processor 610 activates conversion mechanism 650 and supplies it with the HSVLI indicated by the packet. Subsequently, processor 610 activates forwarding-information-obtaining mechanism 660 and supplies it with at least one fixed-length key obtained from conversion mechanism 650. Next, processor 610 activates packet-forwarding mechanism 670 and supplies it with the forwarding information obtained from forwarding-information-obtaining mechanism 660.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method comprising:
  receiving on an input port of a computer a packet with a hierarchically structured variable-length identifier (HSVLI),
  wherein the HSVLI indicates a piece of content and can be hierarchically structured, comprising contiguous components ordered from a most general level to a most specific level; and
  wherein the length of a respective identifier is not fixed; converting the HSVLI into a fixed-length key; obtaining forwarding information based on one or more longest-prefix matches with a longest-prefix-match lookup engine using the fixed-length key; and
  forwarding the packet to an output port based on the forwarding information.

2. The method of claim 1, wherein converting the HSVLI into the fixed-length key comprises:
  dividing the fixed-length key into c segments $s_1, \ldots, s_c$;
  indicating component hashes for first c−1 components of the HSVLI with segments $s_1, \ldots, s_{c-1}$; and
  indicating a hash over the remaining components of the HSVLI with segment $s_c$.

3. The method of claim 2, wherein the lengths of the c segments are not equal and wherein the length of a respective segment can be dynamically re-configured.

4. The method of claim 2, further comprising dynamically determining the lengths of the c segments, the number of HSVLI components hashed into each segment, and/or a value to be arithmetically combined with the fixed-length key, based at least on one or more of the initial components of the HSVLI.

5. The method of claim 1, wherein the longest-prefix-match lookup engine is an Internet Protocol (IP) router.

6. The method of claim 1, wherein the fixed-length key has an Internet Protocol version 4 (IPv4) or an Internet Protocol version 6 (IPv6) address format.

7. The method of claim 1, wherein the forwarding information comprises at least one output port.

8. The method of claim 1, wherein a component in the hierarchical structure comprises one or more of:
- a globally routable name;
- an organizational name;
- a version identifier; and
- a digest.

9. An apparatus comprising:
- a receiving mechanism configured to receive on an input port of a computer a packet with hierarchically structured variable-length identifier HSVLI,
  - wherein the HSVLI indicates a piece of content and can be hierarchically structured, comprising contiguous components ordered from a most general level to a most specific level; and
  - wherein the length of a respective identifier is not fixed;
- a converting mechanism configured to convert the HSVLI into a fixed-length key;
- a forwarding-information-obtaining mechanism configured to obtain forwarding information based on one or more longest-prefix matches with a longest-prefix-match lookup engine using the fixed-length key; and
- a packet-forwarding mechanism configured to forward the packet to an output port based on the forwarding information.

10. The apparatus of claim 9, wherein while converting the HSVLI into the fixed-length key, the converting mechanism is configured to:
- divide the fixed-length key into c segments $s_1, \ldots, s_c$;
- indicate component hashes for first c−1 components of the HSVLI with segments $s_1, \ldots, s_{c-1}$; and
- indicate a hash over the remaining components of the HSVLI with segment $s_c$.

11. The apparatus of claim 10, wherein the lengths of the c segments are not equal, and wherein the length of a respective segment can be dynamically re-configured.

12. The apparatus of claim 10, wherein the converting mechanism is further configured to dynamically determine the lengths of the c segments, the number of HSVLI components hashed into each segment, and/or a value to be arithmetically combined with the fixed-length key, based at least on one or more of the initial components of the HSVLI.

13. The apparatus of claim 9, wherein the longest-prefix-match lookup engine is an Internet Protocol (IP) router.

14. The apparatus of claim 9, wherein the fixed-length key has an Internet Protocol version 4 (IPv4) or an Internet Protocol version 6 (IPv6) address format.

15. The apparatus of claim 9, wherein the forwarding information comprises at least one output port.

16. The apparatus of claim 9, wherein a component in the hierarchical structure comprises one or more of:
- a globally routable name;
- an organizational name;
- a version identifier; and
- a digest.

17. A computer-readable storage device storing instructions that when executed by a computer cause the computer to perform, the following:
- receiving on an input port of a computer a packet comprising an hierarchically structured variable-length identifier (HSVLI),
  - wherein the HSVLI indicates a piece of content and can be hierarchically structured, comprising contiguous components ordered from a most general level to a most specific level; and
  - wherein the length of a respective identifier is not fixed;
- converting the HSVLI into a fixed-length key;
- obtaining forwarding information based on one or more longest-prefix matches with a longest-prefix-match lookup engine using the fixed-length key; and
- forwarding the packet to an output port based on the forwarding information.

18. The device of claim 17, wherein converting the HSVLI into the fixed-length key comprises:
- dividing the fixed-length key into c segments $s_1, \ldots, s_c$;
- indicating component hashes for first c−1 components of the HSVLI with segments $s_1, \ldots, s_{c-1}$; and
- indicating a hash over the remaining components of the HSVLI with segment $s_c$.

19. The device of claim 18, wherein the lengths of the c segments are not equal and wherein the length of a respective segment can be dynamically re-configured.

20. The device of claim 18, wherein the method further comprises dynamically determining the lengths of the c segments, the number of HSVLI components hashed into each segment, and/or a value to be arithmetically combined with the fixed-length key, based at least on one or more of the initial components of the HSVLI.

21. The device of claim 17, wherein the longest-prefix-match lookup engine is an Internet Protocol (IP) router.

22. The method of claim 17, wherein the fixed-length key has an Internet Protocol version 4 (IPv4) or an Internet Protocol version 6 (IPv6) address format.

23. The device of claim 17, wherein the forwarding information comprises at least one output port.

24. The device of claim 17, wherein a component in the hierarchical structure comprises one or more of:
- a globally routable name;
- an organizational name;
- a version identifier; and
- a digest.

* * * * *